(12) United States Patent
Reiche

(10) Patent No.: US 11,270,135 B2
(45) Date of Patent: Mar. 8, 2022

(54) METHOD AND DEVICE FOR CLASSIFYING OBJECTS ON A ROADWAY IN SURROUNDINGS OF A VEHICLE

(71) Applicant: Robert Bosch GmbH, Stuttgart (DE)

(72) Inventor: Martin Reiche, Weil der Stadt (DE)

(73) Assignee: Robert Bosch GmbH, Stuttgart (DE)

(*) Notice: Subject to any disclaimer, the term of this patent is extended or adjusted under 35 U.S.C. 154(b) by 13 days.

(21) Appl. No.: 17/033,351

(22) Filed: Sep. 25, 2020

(65) Prior Publication Data

US 2021/0166043 A1 Jun. 3, 2021

(30) Foreign Application Priority Data

Nov. 28, 2019 (DE) .................. 102019218479.0

(51) Int. Cl.
*G06K 9/00* (2006.01)
*G06T 7/70* (2017.01)
*G06K 9/62* (2022.01)

(52) U.S. Cl.
CPC ..... *G06K 9/00805* (2013.01); *G06K 9/00798* (2013.01); *G06K 9/6215* (2013.01); *G06T 7/70* (2017.01); *G06T 2207/30252* (2013.01)

(58) Field of Classification Search
CPC ........... G06K 9/00805; G06K 9/00798; G06K 9/6215; G06K 9/00791; G06K 9/00718; G06T 7/70; G06T 7/579; G06T 2207/30252; G06T 2207/30261
See application file for complete search history.

(56) References Cited

U.S. PATENT DOCUMENTS

| | | | |
|---|---|---|---|
| 7,046,822 B1* | 5/2006 | Knoeppel | B60W 30/16 382/103 |
| 2014/0334719 A1* | 11/2014 | Takenaka | G06K 9/00369 382/159 |
| 2019/0354778 A1* | 11/2019 | Ermilios | G06T 7/30 |
| 2020/0050865 A1* | 2/2020 | Lehn | G08G 1/096758 |

* cited by examiner

*Primary Examiner* — Carol Wang
(74) *Attorney, Agent, or Firm* — Norton Rose Fulbright US LLP; Gerard Messina

(57) ABSTRACT

A method for classifying objects on a roadway in surroundings of a vehicle. The method includes: reading in image data from a vehicle camera of the vehicle. The image data represent an area of the surroundings which includes the roadway; evaluating the image data including generating a model of a surface of the roadway using identified roadway markings, and an object on the roadway being identified; ascertaining first distance values between the vehicle camera and object image points of the object represented by the image data, and second distance values between the vehicle camera and roadway image points, defined by the model, of the surface of the roadway in surroundings of the object; and comparing the distance values to at least one continuity criterion for distinguishing raised objects from flat objects to classify the object as a raised or flat object as a function of a result of the comparison.

9 Claims, 4 Drawing Sheets

METHOD AND DEVICE FOR CLASSIFYING OBJECTS ON A ROADWAY IN SURROUNDINGS OF A VEHICLE

CROSS REFERENCE

The present application claims the benefit under 35 U.S.C. § 119 of German Patent Application No. DE 102019218479.0 filed on Nov. 28, 2019, which is expressly incorporated herein by reference in its entirety.

FIELD

The present invention is directed to a device and a method for classifying objects on a roadway in surroundings of a vehicle. The present invention also relates to a computer program.

BACKGROUND INFORMATION

Optical flow-based algorithms for distance estimation and the creation of a three-dimensional setting, so-called "structure from motion," are convention. Furthermore, stereo cameras for generating a piece of depth information from a deviating parallax or a disparity are conventional.

SUMMARY

The present invention provides a method, a device using this method, and a corresponding computer program. The measures described herein allow advantageous refinements of and improvements on the device described herein in accordance with the present invention.

According to specific embodiments of the present invention, a virtual roadway model may be generated from roadway markings, in particular for the identification or detection and classification of raised objects on a roadway, which may be used as a reference for a distinction between raised and flat objects. Such raised objects may be, e.g., lost pieces of cargo of preceding vehicles, which are not traversable. Algorithms which are based on the optical flow or on a parallax deviation may be used in the process, for example, the roadway model being able to act as a distance reference for object points during the distinction.

According to specific embodiments of the present invention, the application of the identification or detection and classification of raised objects on the roadway may advantageously be reliably implemented, in particular, for camera applications for highly automated driving. Raised objects may be reliably detected and classified as being raised, for example having a minimum height of, e.g., 20 centimeters, above a roadway surface. If a raised object is present, an emergency brake application may thus be reliably initiated with an appropriate braking cascade, for example. In particular, it may also be reliably prevented that a flat or non-raised object, e.g., a manhole cover or the like, and its image in a vehicle camera may trigger an emergency brake application, or false negative identification cases may be prevented, and thus also possible consequential damages of liability-related relevance, e.g., for a driver or following vehicles. In this way, it is possible, for example, both to detect an object in a lane and assign a distance thereto with a certain error corridor, and to carry out an exact and reliable classification as to whether this object is raised, or planar and thus traversable.

In accordance with the present invention, a method for classifying objects on a roadway in surroundings of a vehicle is provided. In accordance with an example embodiment of the present invention, the method includes the following steps:

reading in image data from an interface to at least one vehicle camera of the vehicle, the image data representing an area of the surroundings including at least the roadway;

evaluating the image data, roadway markings of the roadway being identified, a model of a surface of the roadway being generated using the identified roadway markings, and an object on the roadway being identified;

ascertaining first distance values between the vehicle camera and object image points of the object which are represented by the image data, and second distance values between the vehicle camera and roadway image points, defined by the model, of the surface of the roadway in surroundings of the object; and carrying out a comparison of the distance values to at least one continuity criterion for distinguishing raised objects from flat objects to classify the object as a raised or flat object as a function of a result of the comparison.

This method may, for example, be implemented in software or hardware or in a mixed form made up of software and hardware, for example in a control unit or a device. The vehicle may be a motor vehicle, for example a passenger car or a commercial vehicle. In particular, the vehicle may be a vehicle driving in a highly automated manner, or a vehicle for highly automated driving. The at least one vehicle camera may be mounted or fixedly installed in the vehicle. In the step of evaluating, an object recognition or an algorithm for object recognition may be carried out on the image data. In the step of carrying out, a classification signal may be generated which represents the result of the comparison. The classification signal may be output to an interface to a control unit, an assistance system, and, in addition or as an alternative, another vehicle unit.

According to one specific embodiment of the present invention, the image data may be evaluated in the step of evaluating to generate a three-dimensional model of the surface of the roadway with the aid of interpolation, using the identified roadway markings. Such a specific embodiment offers the advantage that the model may be generated in a simple and exact manner to be able to serve as a reference for exact distance comparisons to objects. This is, in particular, advantageous since roadway surfaces usually do not have a sufficiently coarse texture to allow a direct image representation for distance measurement.

In the step of ascertaining, it is also possible to ascertain the first distance values in rows or in strips in at least one image of the surroundings represented by the image data. Such a specific embodiment offers the advantage that, in particular, the first distance values are ascertained in a simple and reliable manner.

Furthermore, the first distance values between the vehicle camera and object image points along edges of the object may be ascertained in the step of ascertaining. For this purpose, an identification of the edges may be carried out in the step of evaluating. The comparison of the distance values may thus be limited to particularly meaningful image points, the object image points, to obtain the comparison result in a resource-conserving and reliable manner. In addition or as an alternative, the comparison in the step of carrying out may be carried out with respect to a deviation between the first distance values and the second distance values as a continuity criterion. In this way, a simple and exact distinction between raised and flat or planar objects may be effectuated.

In particular, at least one continuity criterion may be used in the step of carrying out, which stipulates that for a classification of the object as a raised object a deviation is minimal between the first distance values and the second distance values in a base area of the object sitting on the surface of the roadway defined by the model, increases along lateral edges of the object away from the surface of the roadway, and is maximal in a top area of the object situated opposite the base area. The base area may include a base edge including at least one base point of the object. The lateral edges may extend between the base area and the top area of the object. The second distance values may relate to roadway image points in the process, which are situated adjoining the base area, the lateral edges, and the top area. Such a specific embodiment offers the advantage that it may be reliably and exactly identified whether or not a raised object is present.

According to one specific embodiment of the present invention, an optical flow of the image data may be used in the step of evaluating and, in addition or as an alternative, in the step of ascertaining. Such a specific embodiment offers the advantage that pieces of distance information or pieces of depth information may be obtained in a simple and reliable manner from multiple image sequences, using the image data. According to one specific embodiment of the present invention, a deviation or disparity of parallaxes of the image data may be used in the step of evaluating and, in addition or as an alternative, in the step of ascertaining. Here, the at least one vehicle camera may be designed as a stereo camera. Such a specific embodiment offers the advantage that pieces of distance information or pieces of depth information may be obtained in a simple and exact manner.

Moreover, a vehicle movement model representing a movement of the vehicle may be evaluated in the step of evaluating to determine a roadway property causing the movement, and to generate the model of the surface of the roadway, using the identified roadway markings and the roadway property. The movement of the vehicle may be a planned, impending movement and, in addition or as an alternative, a movement which has already occurred. The vehicle movement model may be read in by a movement planning unit of the vehicle in the step of reading in. Such a specific embodiment offers the advantage that the roadway model may be generated in an even simpler and more accurate manner.

The present invention furthermore provides a device which is designed to carry out, activate or implement the steps of one variant of a method described here in corresponding units. The object underlying the present invention may also be achieved quickly and efficiently by this embodiment variant of the present invention in the form of a device.

For this purpose, the device may include at least one processing unit for processing signals or data, at least one memory unit for storing signals or data, at least one interface to a sensor or an actuator for reading in sensor signals from the sensor or for outputting data signals or control signals to the actuator and/or at least one communication interface for reading in or outputting data which are embedded into a communication protocol. The processing unit may be a signal processor, a microcontroller or the like, for example, it being possible for the memory unit to be a Flash memory, an EEPROM or a magnetic memory unit. The communication interface may be designed to read in or output data wirelessly and/or in a hard-wired manner, a communication interface which may read in or output hard-wired data being able to read in these data, for example electrically or optically, from a corresponding data transmission line or being able to output these into a corresponding data transmission line.

A device may presently be understood to mean an electrical device which processes sensor signals and outputs control and/or data signals as a function thereof. The device may include an interface which may be designed as hardware and/or software. In the case of a hardware design, the interfaces may, for example, be part of a so-called system ASIC which includes a wide variety of functions of the device. However, it is also possible for the interfaces to be separate integrated circuits, or to be at least partially made up of discrete elements. In the case of a software design, the interfaces may be software modules which are present on a microcontroller, for example, alongside other software modules.

In addition, in accordance with the present invention, a computer program product or computer program is advantageous, having program code which may be stored on a machine-readable carrier or memory medium such as a semiconductor memory, a hard disk memory or an optical memory, and which is used to carry out, implement and/or activate the steps of the method according to one of the specific embodiments described above, in particular if the program product or program is executed on a computer or a device.

Exemplary embodiments of the present invention are shown in the figures and are described in greater detail below.

BRIEF DESCRIPTION OF THE DRAWINGS

In the following description of favorable exemplary embodiments of the present invention, identical or similar reference numerals are used for similarly acting elements shown in the different figures, and a repeated description of these elements is dispensed with.

DETAILED DESCRIPTION OF EXAMPLE EMBODIMENTS

Figure 1:
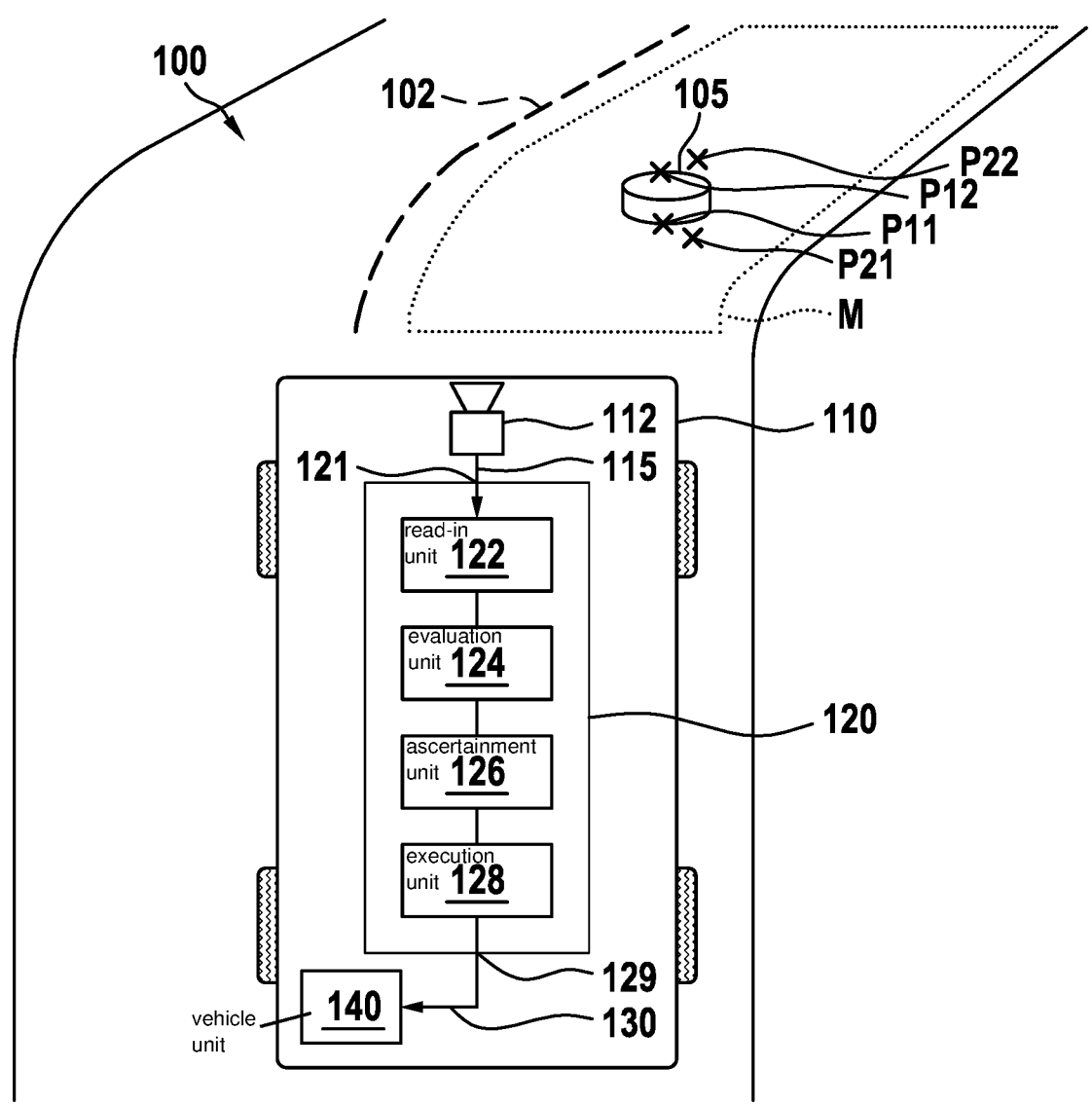
FIG. 1 shows a schematic representation of a vehicle including a device according to an example embodiment of the present invention.

FIG. 1 shows a schematic representation of a vehicle 110 including a device 120 for classifying, or a classification device 120, according to one exemplary embodiment of the present invention. Vehicle 110 is a motor vehicle, for example a passenger car, a truck or another commercial vehicle, in particular, for highly automated driving. Vehicle 110 is situated on a roadway 100, for example a two-lane road here. Roadway 100 includes roadway markings 102, for example a median strip here. Furthermore, an object 105 is situated on roadway 100.

Vehicle 110 only includes one vehicle camera 112 by way of example. Vehicle camera 112 is designed to detect the surroundings of vehicle 110. Vehicle camera 112 is also designed to provide image data 115 which represent an area of the surroundings of vehicle 110 which includes at least roadway 100 or a sub-section of roadway 100. Vehicle 110 furthermore includes device 120. Device 120 and vehicle camera 112 are connected to one another in a signal transmission-capable or data transmission-capable manner. Device 120 is designed to carry out a classification of objects 105 on roadway 100 in surroundings of vehicle 110. For this purpose, device 120 is designed to generate a classification signal 130, using image data 115. Device 120 includes a read-in unit 122, an evaluation unit 124, an ascertainment unit 126, and an execution unit 128.

Read-in unit 122 is designed to read in image data 115 from an interface, an input interface 121 of device 120 here, to the at least one vehicle camera 112. Read-in unit 122 is connected to evaluation unit 124 in a signal transmission-capable or data transmission-capable manner. Evaluation unit 124 is designed to evaluate image data 115. Roadway markings 102 of roadway 100 are identified in the process, a model M of a surface of roadway 100 is generated using the identified roadway markings 102, and object 105 on roadway 100 is identified. Model M is symbolically plotted on roadway 100 in the representation of FIG. 1 for illustration. Evaluation unit 124 is connected to ascertainment unit 126 in a signal transmission-capable or data transmission-capable manner.

Ascertainment unit 126 is designed to ascertain first distance values between vehicle camera 112 and object image points P11, P12 of object 105 which are represented by image data 115, and second distance values between vehicle camera 112 and roadway image points P21, P22, defined by model M, of the surface of roadway 100 in surroundings of object 105. Ascertainment unit 126 is connected to execution unit 128 in a signal transmission-capable or data transmission-capable manner. Execution unit 128 is designed to carry out a comparison of the distance values to at least one continuity criterion for distinguishing raised objects 105 from flat objects 105 to classify object 105 as a raised or flat object as a function of a result of the comparison.

Device 120 is furthermore designed to generate classification signal 130 and to output it, or to provide it for output, via an output interface 129. Classification signal 130 represents the result of the comparison or the classification of object 105 as a raised or flat object. Device 120 is connected to at least one vehicle unit 140 in a signal transmission-capable or data transmission-capable manner via output interface 129. The at least one vehicle unit is, for example, a control unit of vehicle 110 for highly automated driving, a driver assistance system or the like.

Device 120 is, in particular, designed to use an algorithm based on the optical flow of image data 115 and/or a deviation or disparity of parallaxes of image data 115 for the classification. More precisely, according to one exemplary embodiment, evaluation unit 124 is designed to use the optical flow of image data 115 and/or the deviation or disparity of parallaxes of image data 115. In addition or as an alternative, ascertainment unit 126 is designed to use the optical flow of image data 115 and/or the deviation or disparity of parallaxes of image data 115.

In particular, evaluation unit 124 is designed to generate a three-dimensional model of the surface of roadway 100, using roadway markings 102 identified from image data 115, with the aid of interpolation. According to one exemplary embodiment, evaluation unit 124 is also designed to evaluate a vehicle movement model representing a movement of vehicle 110 in order to determine a roadway property of roadway 100 causing the movement, and in order to generate model M of the surface of roadway 100, using roadway markings 102 identified from image data 115 and the roadway property. The roadway property is, for example, a road type, an uphill grade, a curvature or the like. The roadway property may be a physical variable of the movement causing, for example a speed, an acceleration, or the like. In other words, evaluation unit 124 is designed here to also take pieces of information of a vehicle movement model, including its speed, into consideration for the modeling or 3D interpolation of the roadway surface. In this way, e.g., limiting model assumptions for expressway curvature radii or the like are stored.

According to one exemplary embodiment of the present invention, ascertainment unit 126 is designed to ascertain the first distance values, i.e., a distance between vehicle camera 112 and object image points P11, P12 of object 105 which are represented by image data 115, in rows or in strips in at least one image of the surroundings represented by the image data 115. According to one further exemplary embodiment, ascertainment unit 126 is designed to ascertain the first distance values between vehicle camera 112 and object image points P11, P12 along edges of object 105.

According to one exemplary embodiment of the present invention, execution unit 128 is designed to carry out the comparison with respect to a deviation between the first distance values and the second distance values as a continuity criterion.

In particular, execution unit 128 is designed to use at least one continuity criterion for the comparison which stipulates the following conditions a) through c) for a classification of object 105 as a raised object: a) A deviation between the first distance values and the second distance values in a base area of object 105 sitting on the surface of roadway 100 defined by model M shall be minimal. For this purpose, a corresponding pair of image points is shown in the representation of FIG. 1, a first object image point P11 and a first roadway image point P21. b) A deviation between the first distance values and the second distance values along lateral edges of object 105 in a direction away from the surface of roadway 100 shall increase. c) A deviation between the first distance values and the second distance values in a top area of object 105 situated opposite the base area shall be maximal. For this purpose, a corresponding pair of image points is shown in the representation of FIG. 1, a second object image point P12 and a second roadway image point P22.

Figure 2:
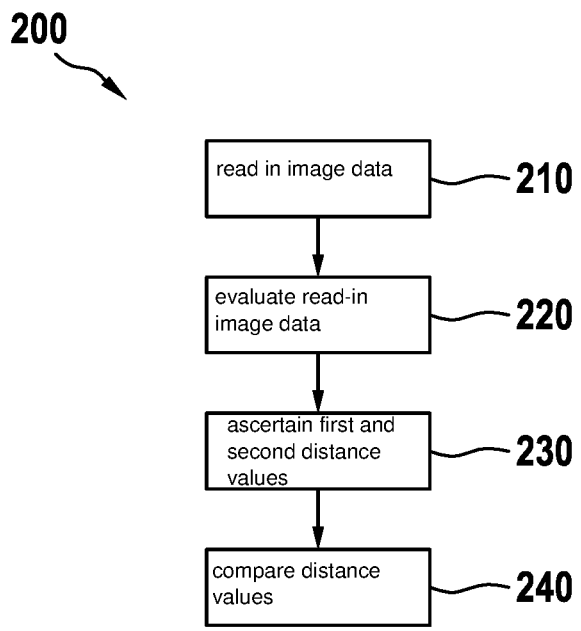
FIG. 2 shows a flow chart of a method for classifying according to an example embodiment of the present invention.

FIG. 2 shows a flow chart of a method 200 for classifying according to one exemplary embodiment of the present invention. Method 200 for classifying is executable to classify objects on a roadway in surroundings of a vehicle. Method 200 for classifying is executable in the process in connection with the vehicle from FIG. 1, or a similar vehicle, and/or in connection with the device from FIG. 1, or a similar device. Method 200 for classifying includes a step 210 of reading in, a step 220 of evaluating, a step 230 of ascertaining, and a step 240 of carrying out.

In step 210 of reading in, image data from an interface to at least one vehicle camera of the vehicle are read in. The image data represent an area of the surroundings which includes at least the roadway. Thereafter, in step 220 of evaluating, the image data read-in in step 210 of reading in are evaluated. Roadway markings of the roadway are identified in the process. Furthermore, a model of a surface of the roadway is generated here, using the identified roadway markings. In addition, at least one object on the roadway is identified in the process. In step 230 of ascertaining, first distance values between the vehicle camera and object image points of the object which are represented by the image data, and second distance values between the vehicle camera and roadway image points, defined by the model, of the surface of the roadway in surroundings of the object, are ascertained. In step 240 of carrying out, a comparison of the distance values to at least one continuity criterion is then carried out for distinguishing raised objects from flat objects to classify the object as a raised or flat object as a function of a result of the comparison.

Figure 3:
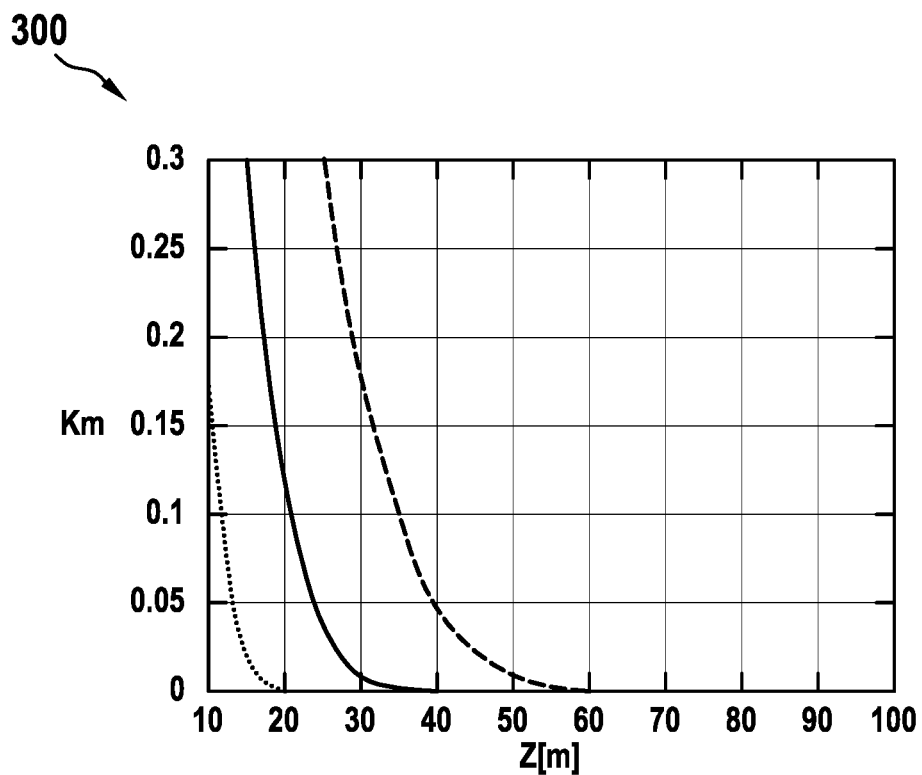
FIG. 3 shows a diagram of a Michelson contrast for an optical system according to an example of the present invention.

FIG. 3 shows a diagram 300 of a Michelson contrast $K_m$ for an optical system as a function of distance Z. The optical system may be a vehicle camera, for example, such as the vehicle camera from FIG. 1. In diagram 300, distance Z in meters [m] is plotted on the x-axis, and Michelson contrast $K_m$ is plotted on the y-axis.

Figure 4:
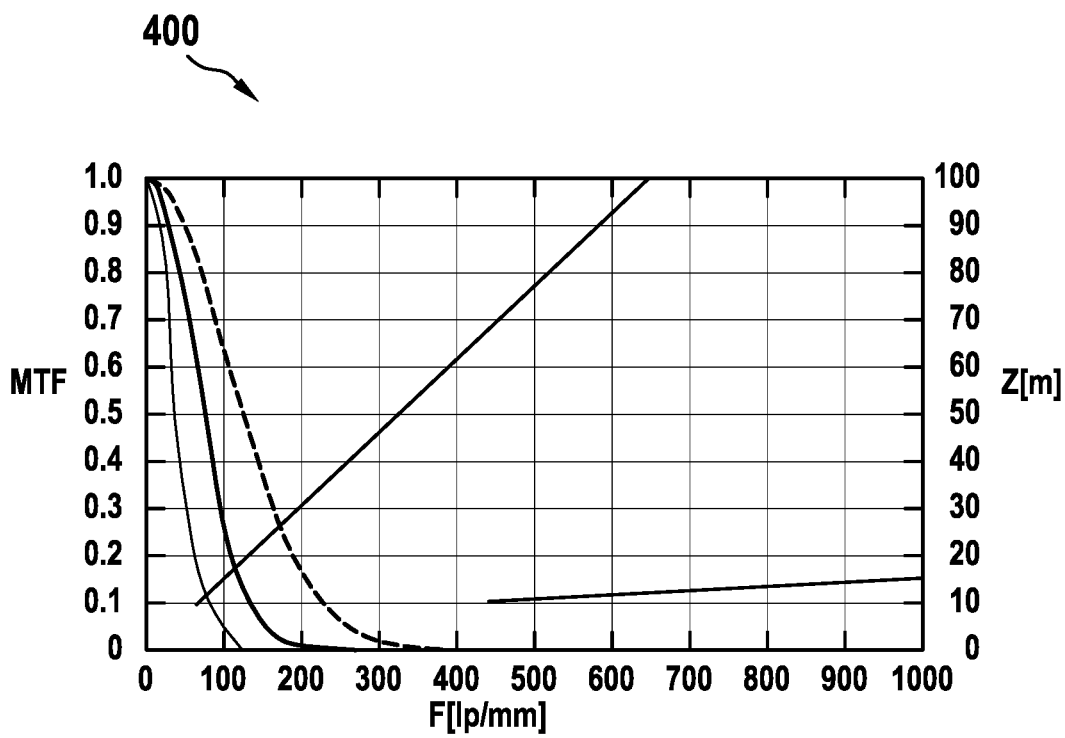
FIG. 4 shows a diagram of spatial frequencies and a modulation transfer function for an optical system according to an example embodiment of the present invention.

FIG. 4 shows a diagram 400 of spatial frequencies F and of a modulation transfer function MTF for an optical system. The optical system may be a vehicle camera, for example, such as the vehicle camera from FIG. 1. In diagram 400, spatial frequencies F are plotted in line pairs per millimeter [lp/mm] on the x-axis, and modulation transfer function MTF and distance Z in meters [m] are plotted on y-axes. Diagram 400 applies to a ground surface where $d_s$=1 cm, $y_s$=1.5 m, and X=0.

In other words, FIG. 3 and FIG. 4 show spatial frequencies F of a roadway ground surface granulated at 1 cm on an optical image and their Michelson contrast $K_m$ with a typical image sharpness. It is apparent that a regular granularity or texture of the roadway is not readily representable. A homogeneous roadway paving does not have a texture which is sufficiently coarse so as to be representable on an image using cost-effective optics and affordable imager scans. A focusing of so-called "fixed focus" cameras is thus only good to a limited degree since it is to focus to infinity for an object distance of, e.g., 10 meters. In addition, there are aberrations, e.g., from temperature drifts of the focus and manufacturing tolerances. A diffraction limitation is thus not a relevant measure for vehicle cameras. Scanning, and thus the pixel size of an imager, also cannot be arbitrarily decreased since with this, e.g., a sensitivity or a signal-to-noise ratio declines. Further limiting details are, e.g., power loss, transmission bandwidths and memory sizes. As a result, rather large irregular roadway properties tend to be detected, such as, for example, bumps, bitumen joints or the like, whose spatial frequencies F are below, e.g., 100 1 p/mm in their image. Since, in turn, the related context is missing for these objects whose spatial frequencies F are considerably above the representable 200 1 p/mm, this context cannot be readily represented. As a result, it is also not possible to decide from a comparison between context and object whether these objects are embedded in a raised or planar manner in the roadway surface. In the raised case, e.g., a discontinuity of the disparity or of the flow vector length would arise at the circumferential upper object edge in relation to the background. Furthermore, a classification of an object as "lost cargo" based on shape and texture is difficult since this does not follow any known or predictable patterns. A lost cargo is not always a "Euro pallet," e.g., for which a neural network (CNN) could be trained. The challenge is thus to find a method or an evaluation algorithm which, despite lacking information surrounding the object, arrives at the decision that it is raised or not raised. This is achieved according to exemplary embodiments, a discontinuity of an optical flow or a stereo disparity of object edges in relation to the ground surface or a roadway model being evaluated for the classification of an object as "raised."

Figure 5:
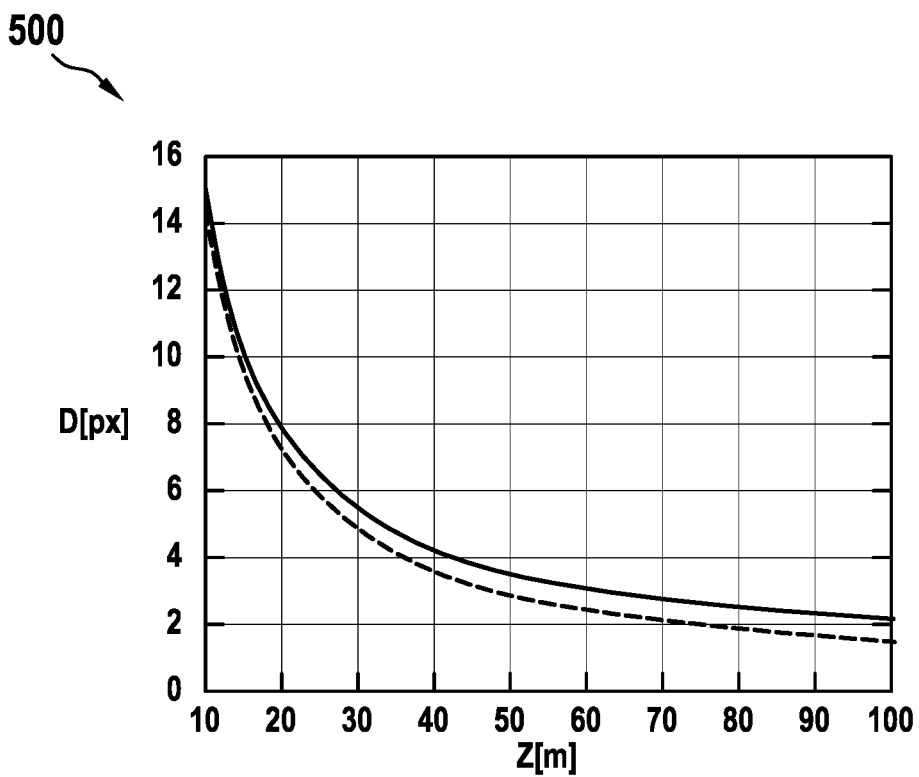
FIG. 5 shows a disparity difference diagram for an optical system according to an example embodiment of the present invention.

FIG. 5 shows a disparity difference diagram 500 for an optical system. The optical system may be a vehicle camera, for example, such as the vehicle camera from FIG. 1. In disparity difference diagram 500, distance Z in meters [m] is plotted on the x-axis, and a disparity in pixels [px] is plotted on the y-axis. In other words, graphs in FIG. 5 show an expectable disparity difference of the object upper edge to the expected background, here a three-dimensional model of the roadway surface, across distance Z, for X=0, ys=1.5 m, basis 0.2 m.

Figure 6:
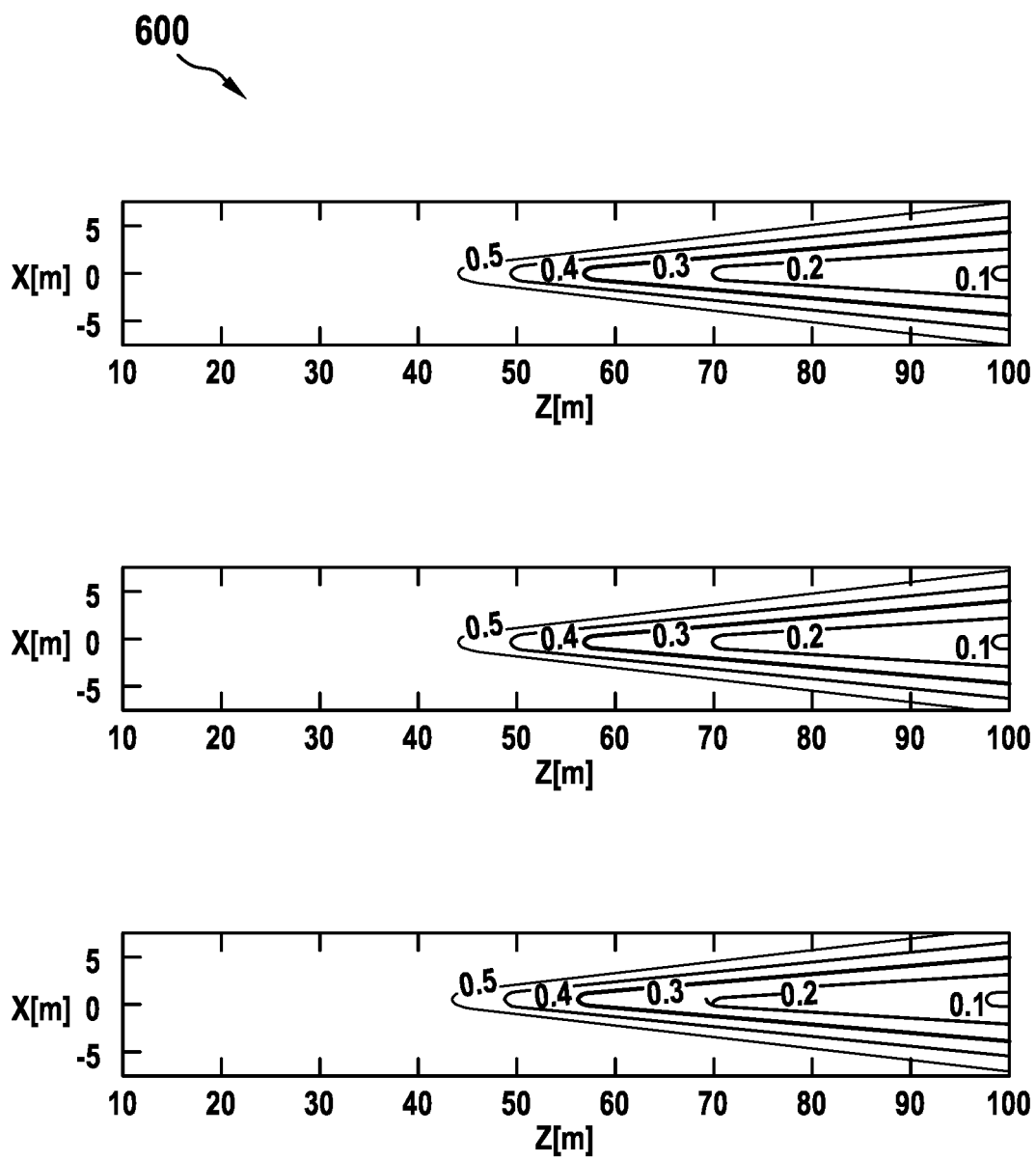
FIG. 6 shows a flow difference diagram for an optical system according to an example embodiment of the present invention.

FIG. 6 shows flow difference diagrams 600 for an optical system. The optical system may be a vehicle camera, for example, such as the vehicle camera from FIG. 1. In flow difference diagrams 600, distance Z in meters [m] is plotted on the x-axis, and a lateral placement X in meters [m] is plotted on the y-axis. In other words, graphs in FIG. 6 show a flow difference of the object upper edge across distance Z and lateral placement X to the expected background, here a three-dimensional model of the roadway surface, graphs in a first flow difference diagram showing a flow difference or a differential flow in pixels [px] on a top left object corner for ys=1.5 m, graphs in a second flow difference diagram show a flow difference or a differential flow in pixels [px] on a central object upper edge for ys=1.5 m, and graphs in a third flow difference diagram show a flow difference or a differential flow in pixels [px] on a top right object corner for ys=1.5 m.

With reference to the above-described figures, exemplary embodiments and advantages are briefly explained again hereafter in summary and in other words.

According to exemplary embodiments, roadway markings 102 are used to calculate an interpolating three-dimensional model M a surface of roadway 100. This may take place both using stereo disparity and using the optical flow. In the process, the knowledge may be utilized that a) roadway markings 102 are structures having a known shape and/or trajectory which may be easily found in the image, and b) a planarity or non-raised state of roadway markings 102 on the surface of roadway 100 may be assumed as given. (This does not apply, e.g., to an arbitrary bitumen joint, which does not differ in the image from an accordingly curved raised wire.). For example, each representable object 105 is calculated with respect to disparity or optical flow in rows or in strips in the image. Immediate surroundings of object 105 do not need to be representable (due to higher spatial frequencies of a texture of roadway 100).

Rather, the disparity or the optical flow of object 105 is compared at its delimiting edges to the disparity or the optical flow of the model or three-dimensional model M of roadway 100. In the case of the raised object 105 sitting on roadway 100, this results in the following conditions or continuity criteria:

a) Continuous distance information from disparity or optical flow at the sitting base point of object 105 to the model roadway surface or to model M.

b) Increasing discontinuity of the distance information from disparity or optical flow along the lateral object edges with the object height compared to the modeled roadway background or model M.

c) Maximum discontinuity of the distance information from disparity or optical flow along the upper object edges compared to the modeled roadway background or model M.

If criteria a) through c) are met, object 105 is a raised object plausibly sitting on roadway 100.

If one exemplary embodiment includes an "and/or" linkage between a first feature and a second feature, this should be read in such a way that the exemplary embodiment according to one specific embodiment includes both the first feature and the second feature, and according to an additional specific embodiment includes either only the first feature or only the second feature.

What is claimed is:

1. A method for classifying objects on a roadway in surroundings of a vehicle, the method comprising the following steps:
   reading in image data from an interface to at least one vehicle camera of the vehicle, the image data representing an area of the surroundings which includes at least the roadway;
   evaluating the image data, wherein in the evaluating, roadway markings of the roadway are identified, a model of a surface of the roadway is generated using the identified roadway markings, and an object on the roadway is identified;
   ascertaining first distance values between the at least one vehicle camera and object image points of the object which are represented by the image data, and second distance values between the at least one vehicle camera and roadway image points, defined by the model, of the surface of the roadway in surroundings of the object; and
   carrying out a comparison of the first and second distance values to at least one continuity criterion for distinguishing raised objects from flat objects to classify the object as a raised or flat object as a function of a result of the comparison.

2. The method as recited in claim 1, wherein the model is a three-dimensional model of the surface of the roadway, the image data being evaluated in the step of evaluating to generate the three-dimensional model of the surface of the roadway using interpolation, and using the identified roadway markings.

3. The method as recited in claim 1, wherein, in the step of ascertaining, the first distance values are ascertained in rows or in strips in at least one image of the surroundings of the vehicle which is represented by the image data.

4. The method as recited in claim 1, wherein: (i) the first distance values between the vehicle camera and object image points along edges of the object are ascertained in the step of ascertaining, and/or (ii) the comparison with respect to a deviation between the first distance values and the second distance values as a continuity criterion is carried out in the step of carrying out.

5. The method as recited in claim 1, wherein the at least one continuity criterion includes a continuity criterion which stipulates that for a classification of the object as a raised object a deviation is minimal between the first distance values and the second distance values in a base area of the object sitting on the surface of the roadway defined by the model, increases along lateral edges of the object away from the surface of the roadway, and is maximal in a top area of the object situated opposite the base area.

6. The method as recited in claim 1, wherein an optical flow of the image data and/or a deviation or disparity of parallaxes of the image data, is used in the step of evaluating and/or in the step of ascertaining.

7. The method as recited in claim 1, wherein a vehicle movement model representing a movement of the vehicle is evaluated in the step of evaluating to determine a roadway property causing the movement, and to generate the model of the surface of the roadway, using the identified roadway markings and the roadway property.

8. A device configured to classify objects on a roadway in surroundings of a vehicle, the device configured to:
   read in image data from an interface to at least one vehicle camera of the vehicle, the image data representing an area of the surroundings which includes at least the roadway;
   evaluate the image data, wherein in the evaluating, roadway markings of the roadway are identified, a model of a surface of the roadway is generated using the identified roadway markings, and an object on the roadway is identified;
   ascertain first distance values between the at least one vehicle camera and object image points of the object which are represented by the image data, and second distance values between the at least one vehicle camera and roadway image points, defined by the model, of the surface of the roadway in surroundings of the object; and
   carry out a comparison of the first and second distance values to at least one continuity criterion for distinguishing raised objects from flat objects to classify the object as a raised or flat object as a function of a result of the comparison.

9. A non-transitory machine-readable memory medium on which is stored a computer program for classifying objects on a roadway in surroundings of a vehicle, the computer program, when executed by a computer, causing the computer to perform the following steps:
   reading in image data from an interface to at least one vehicle camera of the vehicle, the image data representing an area of the surroundings which includes at least the roadway;
   evaluating the image data, wherein in the evaluating, roadway markings of the roadway are identified, a model of a surface of the roadway is generated using the identified roadway markings, and an object on the roadway is identified;
   ascertaining first distance values between the at least one vehicle camera and object image points of the object which are represented by the image data, and second distance values between the at least one vehicle camera and roadway image points, defined by the model, of the surface of the roadway in surroundings of the object; and
   carrying out a comparison of the first and second distance values to at least one continuity criterion for distinguishing raised objects from flat objects to classify the object as a raised or flat object as a function of a result of the comparison.

* * * * *